(12) United States Patent
Kim et al.

(10) Patent No.: US 11,157,535 B2
(45) Date of Patent: Oct. 26, 2021

(54) METHOD AND SYSTEM FOR SUBJECT-BASED RANKING CONSIDERING WRITER-READER INTERACTION

(71) Applicant: NAVER Corporation, Seongnam-si (KR)

(72) Inventors: Jinhong Kim, Seongnam-si (KR); Sanghoon Lee, Seongnam-si (KR); Jin Hee Kim, Seongnam-si (KR); Chan Hoon Park, Seongnam-si (KR); Kwang Hyun Kim, Seongnam-si (KR); Inho Kang, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 312 days.

(21) Appl. No.: 15/944,384

(22) Filed: Apr. 3, 2018

(65) Prior Publication Data

US 2018/0285366 A1   Oct. 4, 2018

(30) Foreign Application Priority Data

Apr. 3, 2017   (KR) .................. 10-2017-0043078

(51) Int. Cl.
| | |
|---|---|
| *G06F 16/335* | (2019.01) |
| *G06F 16/9535* | (2019.01) |
| *G06N 20/00* | (2019.01) |
| *G06F 16/2457* | (2019.01) |
| *G06N 3/04* | (2006.01) |
| *G06N 5/02* | (2006.01) |

(52) U.S. Cl.
CPC ...... *G06F 16/337* (2019.01); *G06F 16/24578* (2019.01); *G06F 16/335* (2019.01); *G06F 16/9535* (2019.01); *G06N 3/0454* (2013.01); *G06N 20/00* (2019.01); *G06N 5/022* (2013.01)

(58) Field of Classification Search
CPC .. G06F 16/337; G06F 16/3334; G06F 16/383; G06F 16/335; G06F 16/9535
See application file for complete search history.

(56) References Cited

U.S. PATENT DOCUMENTS

| | | | | |
|---|---|---|---|---|
| 7,836,051 | B1 * | 11/2010 | Mason | G06F 16/9535 707/734 |
| 8,458,196 | B1 * | 6/2013 | Procopio | G06F 16/35 707/749 |
| 9,032,289 | B1 * | 5/2015 | Cierniak | G06F 16/9558 715/255 |
| 2002/0016786 | A1 * | 2/2002 | Pitkow | G06F 16/9562 |
| 2005/0222989 | A1 * | 10/2005 | Haveliwala | G06F 16/9535 |
| 2006/0026593 | A1 * | 2/2006 | Canning | G06F 9/4843 718/100 |

(Continued)

FOREIGN PATENT DOCUMENTS

KR   100963392 B1   6/2010

*Primary Examiner* — Marc S Somers
(74) *Attorney, Agent, or Firm* — Greer Burns & Crain Ltd.

(57) ABSTRACT

A subject-based ranking determining method and system based on an interaction between a writer and a reader. A subject-based ranking determining method may include evaluating a writer that creates content of a corresponding subject for each subject based on the corresponding subject; and providing a search result in which an evaluation result of the writer on a subject corresponding to an input query is applied to a content ranking in response to input of the query.

5 Claims, 13 Drawing Sheets

(56) References Cited

U.S. PATENT DOCUMENTS

| | | | |
|---|---|---|---|
| 2006/0059121 A1* | 3/2006 | Zhang | G06F 16/313 |
| 2006/0112105 A1* | 5/2006 | Adamic | G06F 16/31 |
| 2006/0248076 A1* | 11/2006 | Troy | G06F 16/38 |
| 2009/0282013 A1* | 11/2009 | Joshi | G06F 16/958 |
| 2012/0272160 A1* | 10/2012 | Spivack | H04L 43/16 |
| | | | 715/752 |
| 2012/0323828 A1* | 12/2012 | Sontag | G06F 16/93 |
| | | | 706/12 |
| 2013/0246404 A1* | 9/2013 | Annau | G06F 16/24534 |
| | | | 707/723 |
| 2016/0042299 A1* | 2/2016 | Liang | G06F 3/04817 |
| | | | 706/12 |

* cited by examiner

METHOD AND SYSTEM FOR SUBJECT-BASED RANKING CONSIDERING WRITER-READER INTERACTION

CROSS-REFERENCE TO RELATED APPLICATION(S)

This application claims priority under 35 U.S.C. § 119 to Korean Patent Application No. 10-2017-0043078 filed on Apr. 3, 2017, in the Korean Intellectual Property Office (KIPO), the entire contents of which are incorporated herein by reference.

BACKGROUND

Field

One or more example embodiments relate to a technique for determining rankings of documents provided as a search result.

Description of Related Art

A search service, which is one of various services provided using the Internet, refers to a service that conducts a search for information available on the Internet in response to a query input from a user and provides the user with a search result corresponding to the query.

A search service providing system that provides the search service may construct a database by collecting, indexing, and storing documents on the Internet, may search for documents stored in the database in response to a search request from a user d may provide a search result to the user.

For example, Korean Patent Registration No. 10-0963392, registered on Jun. 4, 2010, discloses a technique that provides a search result based on similarity between contents.

Many existing search techniques search for documents having a relatively high content similarity in response to a query input from a user, determine rankings of the retrieved documents based on a plurality of document characteristics, such as a document quality, recentness, and a number of user clicks, etc., and provide a search result based on the determined rankings.

Such search technology generally depends on a query and does not overall apply content creation and consumption activities performed on the Internet. Accordingly, there are some constraints in enhancing the quality of a search result.

SUMMARY

One or more example embodiments provide a method and system that may evaluate a writer and a reader based on user activity occurring in a document creation and consumption space on the Internet for each document subject and may apply an evaluation result of the writer and an evaluation result of the reader to a document ranking.

One or more example embodiments also provide a method and system that may verify a subject corresponding to a query and may preferentially display a document created by a "professional" writer or a document consumed by the "professional" reader at a relatively high ranking with respect to documents of the corresponding subject.

According to an aspect of at least one example embodiment, there is provided a computer-implemented subject-based ranking determining method including evaluating a writer that creates content of a corresponding subject for each subject based on the corresponding subject; and providing a search result in which an evaluation result of the writer on a subject corresponding to an input query is applied to a content ranking in response to input of the query.

The subject-based ranking determining method may further include calculating a score by subject for each piece of content using a subject classification learning model. The evaluating may include evaluating the writer for each subject based on the score by subject.

The subject-based ranking determining method may further include calculating a score by subject for each piece of content using a subject classification learning model; and calculating a score by subject for the writer by summing a score by subject for each piece of content created by the writer.

The calculating of the score by subject for the writer may include applying a weight corresponding to a time interval of content created by the writer to the score by subject for the writer.

The calculating of the score by subject for the writer may include applying a weight corresponding to a number of pieces of contents created by the writer during a unit time to the score by subject for the write.

The calculating of the score by subject for the writer may include applying a weight corresponding to a score ranking to the score by subject for the writer.

The evaluating may include determining writer rankings based on scores by writers associated with a corresponding subject for each subject.

The evaluating may include evaluating a reader that consumes a document of a corresponding subject for each subject; and applying an evaluation result of the reader to the evaluation result of the writer.

The providing may include verifying the subject corresponding to the query; searching for target content corresponding to the query; and applying a writer ranking corresponding to a score by writer associated with the verified subject to a content ranking of the target content.

The subject-based ranking determining method may further include calculating a score by subject for the reader by summing a score by subject of each of documents consumed by the reader. The providing may further include applying a reader ranking corresponding to a score by reader associated with the verified subject to the content ranking of the target content.

According to an aspect of at least one example embodiment, there is provided a computer-implemented subject-based ranking determining method including evaluating a writer that creates content of a corresponding subject and a reader that consumes the content of the corresponding subject for each subject based on the corresponding subject; and providing a search result in which an evaluation result of the writer and an evaluation result of the reader on a subject corresponding to an input query are applied to a content ranking in response to input of the query.

According to an aspect of at least one example embodiment, there is provided a non-transitory computer-readable recording medium storing instructions that, when executed by a processor, cause the processor to perform a subject-based ranking determining method including: evaluating a writer that creates content of a corresponding subject for each subject based on the corresponding subject; and providing a search result in which an evaluation result of the writer on a subject corresponding to an input query is applied to a content ranking in response to input of the query.

According to an aspect of at least one example embodiment, there is provided a computer-implemented subject-based ranking determining method including at least one processor configured to execute computer-readable instructions. The at least one processor includes an evaluator configured to evaluate a writer that creates content of a corresponding subject for each subject based on the corresponding subject; and a search conductor configured to provide a search result in which an evaluation result of the writer on a subject corresponding to a query is applied to a content ranking in response to input of the query.

According to some example embodiments, it is possible to create a document creation-consumption virtuous cycle structure by collecting a user's activity occurring in a document creation and consumption space on the Internet and by searching for a "professional" writer and a "professional" reader for each subject.

Also, according to some example embodiments, it is possible to evaluate a credibility of each of a plurality of documents belonging to each subject for each subject based on an interaction between a writer and a reader and to apply an evaluation result to a document ranking of the corresponding subject.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
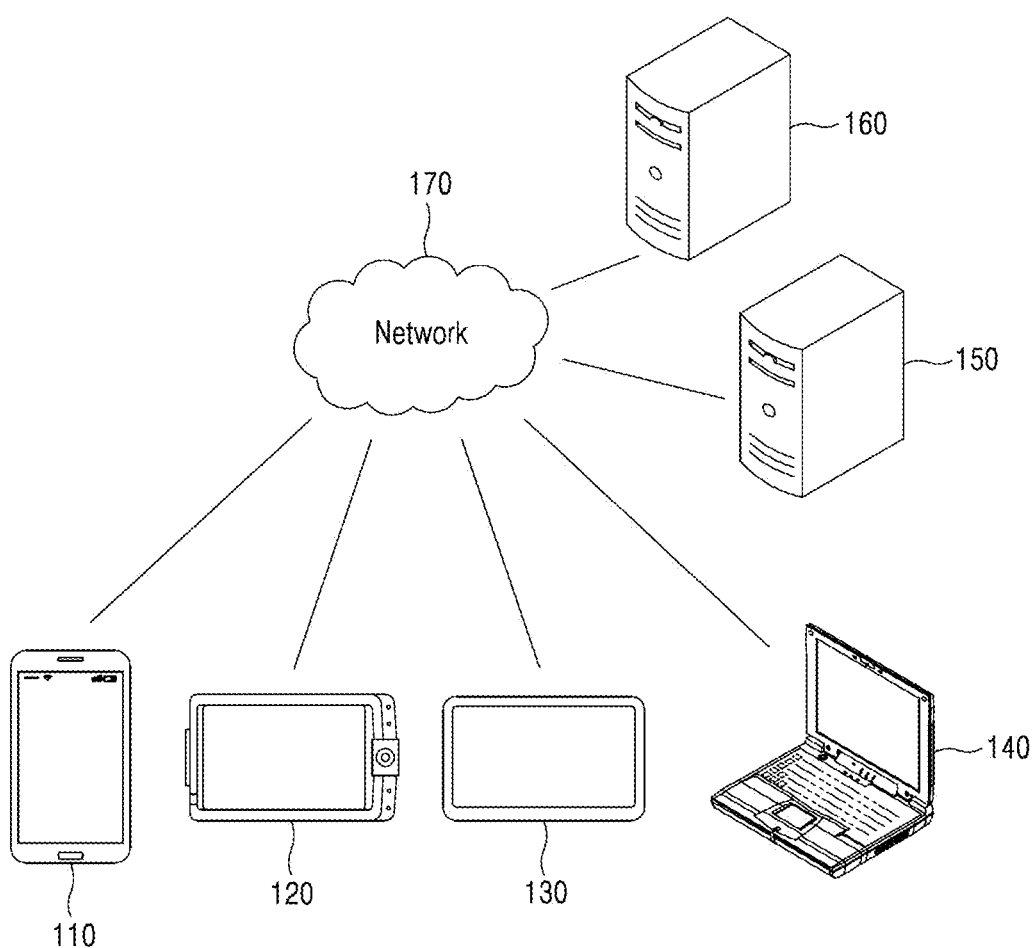
FIG. 1 is a diagram illustrating an example of a network environment according to at least one example embodiment.

It should be noted that these figures are intended to illustrate the general characteristics of methods and structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items, Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a computer processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a computer processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more data storage devices. The one or more data storage devices may be tangible or non-transitory computer-readable storage media, such as random access memory (RAM), read only memory (ROM), a permanent mass storage device a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium, Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more data storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to a technique for determining rankings of documents provided as a search result, and more particularly, to a technique for searching for a professional writer and a professional reader for each subject and applying a search result of the professional writer and a search result of the professional reader to a document ranking corresponding to a query subject.

The example embodiments disclosed herein may apply an evaluation result of each of a writer and a reader to a subject-based document ranking and, accordingly, may achieve many advantages, such as quality enhancement, accuracy, utility, cost reduction, and the like.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices and/or a number of servers are not limited thereto.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a tablet personal computer (PC), a navigation, a computer, a laptop computer, a digital broadcasting terminal, a personal digital assistance (PDA), a portable multimedia player (PMP), and the like. For example, the electronic device 110 may communicate with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network, for example, a mobile communication network, the wireless Internet, a broadcasting network, etc., which may be included in the network 170, For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provide(s) instructions, codes, files, contents, services, and the like through communication with the plurality of electronic devices 110, 120, 130, and 140 over the network 170.

For example, the server 160 may provide a file for installing an application to the electronic device 110 connected through the network 170. In this case, the electronic device 110 may install the application using the file provided from the server 160. Also, the electronic device 110 may access the server 150 under the control of at least one program, for example, a browser or the installed application, or an operating system (OS) included in the electronic device 110, and may use a service or content provided from the server 150. For example, when the electronic device 110 transmits a service request message to the server 150 through the network 170 under the control of the application, the server 150 may transmit a code corresponding to the service request message to the electronic device 110 and the electronic device 110 may provide content to a user by configuring and displaying a screen according to the code under control of the application.

Figure 2:
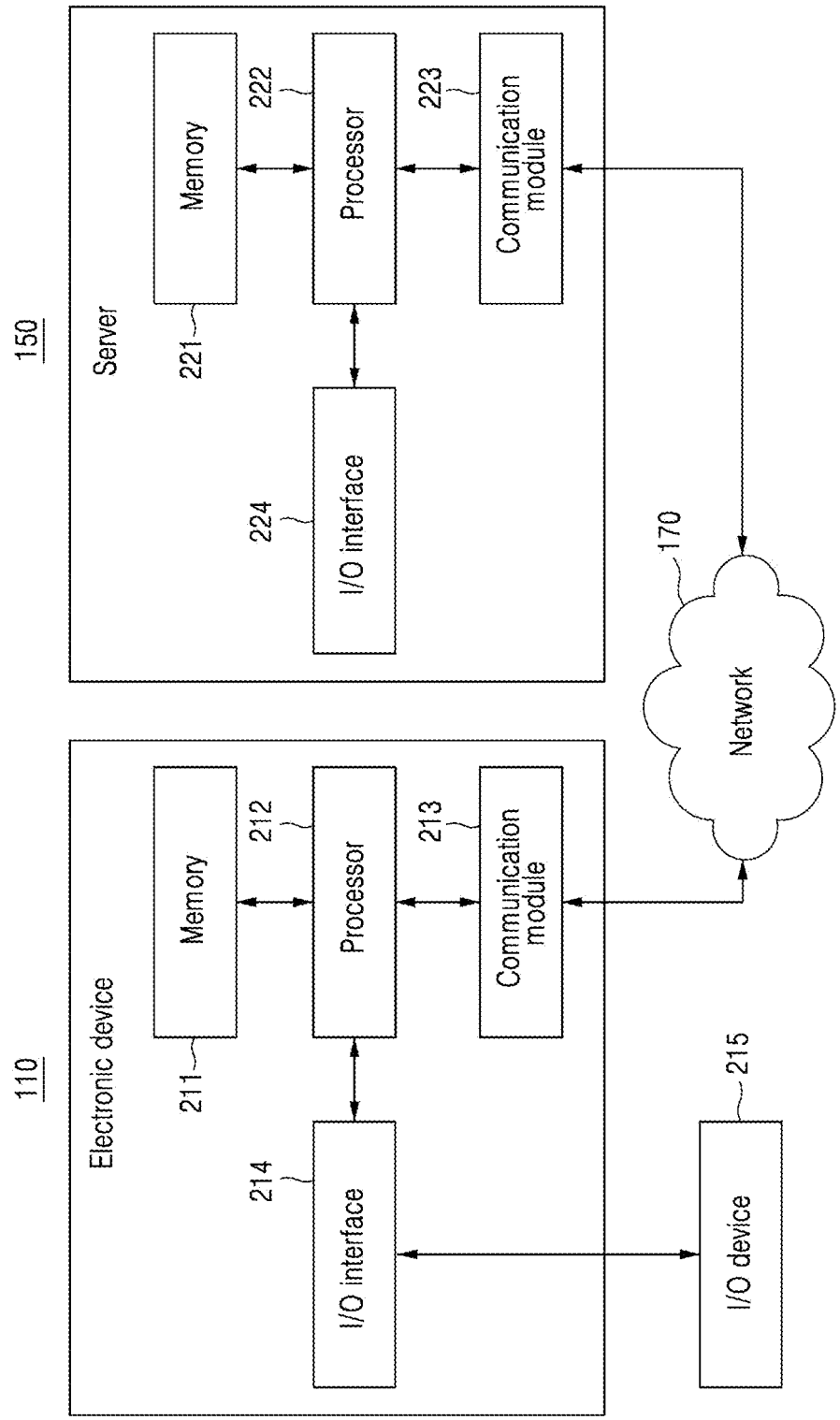
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

Referring to FIG. 2, the electronic device 110 may include a memory 211, a computer processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), read only memory (ROM), a disk drive, a solid state drive, a flash memory, etc., as a non-transitory computer-readable storage medium. Also, an OS or at least one program code, for example, a code for an application installed and executed on the electronic device 110, etc., may be stored in the memory 211, 221. Such software components may be loaded from another non-transitory computer-readable storage medium separate from the memory 211, 221 using a drive mechanism. The other non-transitory computer-readable storage medium may include, for example, a floppy drive, a disk, a tape, a DVD/CD-ROM drive, a memory card, etc. According to other example embodiments, software components may be loaded to the memory 211, 221 through the communication module 213, 223, instead of, or in addition to, the non-transitory computer-readable storage medium. For example, at least one program may be loaded to the memory 211, 221 based on a program, for example, the application, installed by files provided over the network 170 from developers or a file distribution system, for example, the server 160, which provides an installation file of the application.

The electronic device 110 and the server 150 may further include a database system (not shown) to store information that is used by or output from the electronic device 110 and the server 150 in addition to the memory 211, 221. The database system may include a volatile memory, a permanent memory, a virtual memory, and/or other types of memories. For example, the database system may include (RAM) and dynamic RAM (DRAM).

The processor 212, 222 may be configured to process computer-readable instructions of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device, such as the memory 211, 222.

The communication modules 213, 223 may provide a function for communication between the electronic device 110 and the server 150 over the network 170, and may provide a function for communication between the electronic device 110 and the server 150 and another electronic device, for example, the electronic device 120 or another server, for example, the server 160. For example, the processor 212 of the electronic device 110 may transfer a request, for example, a search request, created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium further includable in the electronic device 110.

The I/O interface 214 may be a device used for interface with an I/O device 215. For example, an input device may include a keyboard, a mouse, a microphone, a camera, etc., and an output device may include a device, such as a display for displaying a communication session of the application. As another example, the I/O interface 214 may be a device to interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120 or may display content on a display through the I/O interface 214. Likewise, when processing instructions of the computer program loaded to the memory 221, the processor 222 of the server 150 may output information configured using data provided from the server 150.

According to other example embodiments, the electronic device 110 and the server 150 may include a greater or lesser number of components than the number of components shown in FIG. 2. However, there is no need to clearly illustrate many components according to the related art. For example, the electronic device 110 may include at least a portion of the I/O device 215, or may further include other components, such as a transceiver, a global positioning system (GPS) module, a camera, a variety of sensors, a database, and the like. In detail, if the electronic device 110 is a smartphone, the electronic device 110 may be configured to further include a variety of components, such as an accelerometer sensor, a gyro sensor, a camera, various physical buttons, a button using a touch panel, an I/O port, a vibrator for vibration, etc., which are generally included in the smartphone.

Hereinafter, example embodiments of a method and system for determining a ranking of a subject-based document based on an interaction between a writer and a reader (also, referred to as a writer-reader interaction) will be discussed.

Figure 3:
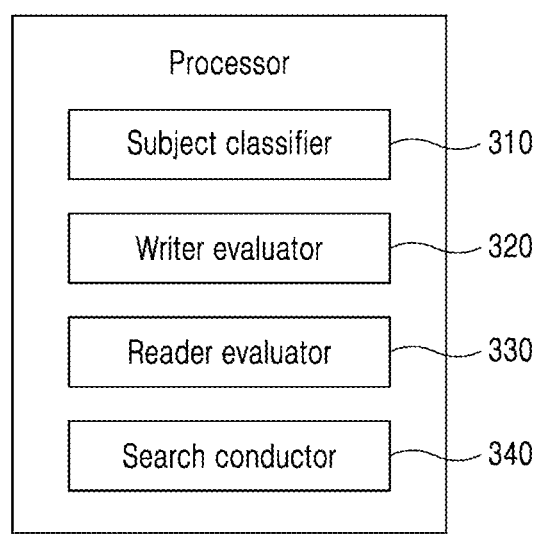
FIG. 3 illustrates an example of components includable in a processor of a server according to at least one example embodiment.

FIG. 3 illustrates an example of a processor of a server according to at least one example embodiment.

The server 150 may serve as a service platform that provides a search service to the plurality of electronic devices 110, 120, 130, and/or 140 that are clients, and may evaluate a writer and a reader for each subject based on a specific subject and may apply an evaluation result to a document ranking.

Herein, the term "document" refers to data in which files such as texts are represented in a logical structure, and may inclusively indicate typical data such as database and atypical data such as web data of a blog, a chatroom, the comments section of a webpage of content, etc. Features of the example embodiments may be applicable to a text-based document and/or any other type of content, for example, moving pictures, images, etc. That is, the example embodiments may be applicable to a ranking determining system based on any type of content, for example, texts, images, moving pictures, etc., which are provided through the Internet or computer communication. Hereinafter, a description is made by applying a text-based document as a representative example of content.

Herein, the term "subject" refers to a key idea of document content and may be a standard used to classify a corresponding document. Also, the term "writer" refers to an entity that creates, for example, writes, a document and the term "reader" refers to an entity that consumes, for example, reads, the document.

Referring to FIG. 3, the processor 222 of the server 150 may include a subject classifier 310, a writer evaluator 320, a reader evaluator 330, and a search conductor 340 as components. The processor 222 and the components of the processor 222 may control the server 150 to perform the overall operations described in the following sections. Here, the processor 222 and the components of the processor 222 may be configured to execute an instruction according to a code of at least one program and a code of an OS included in the memory 221. Also, the components of the processor 222 may be representations of different functions performed by the processor 222 in response to a control instruction provided from the OS or the at least one program. For example, the subject classifier 310 may be used as a functional representation that is controlled by the processor 222 to classify a subject in response to the control instruction.

Here, proposed is a methodology that searches for a professional writer and a professional reader for each subject by collecting and aggregating user activity occurring in a document creation and consumption space on the Internet.

Subject Classification

The server 150 may provide a document ranking in which a "professionality" level for each subject is considered based on a corresponding subject. That is, a document created by a writer having a relatively high credibility and/or a document consumed by a reader having a relatively high credibility with respect to a subject of a query may be considered as being "professionally" written or "professionally" read (i.e., read by a "professional"), and such document may be preferentially displayed.

To this end, through subjection classification, the subject classifier 310 may verify a subject (document subject) to which each document belongs, a "professional" field (writer subject) in which a writer generally creates a document, a field of interest (reader subject) in which a reader generally consumes a document, and a subject (query subject) to which each query belongs.

Figure 4:
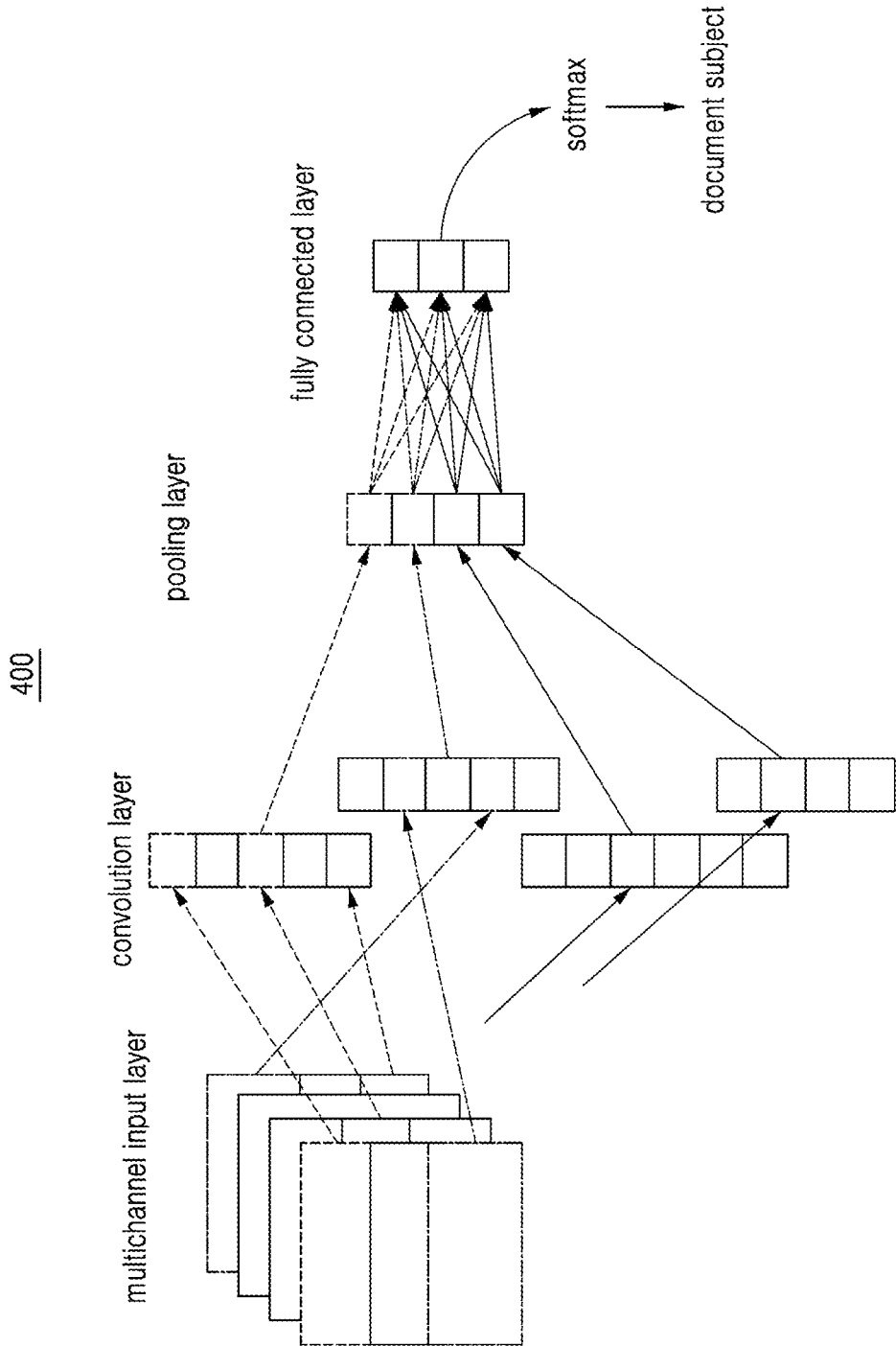
FIGS. 4 through 8 illustrate examples of a process of verifying a document subject according to at least one example embodiment.
Figure 5:
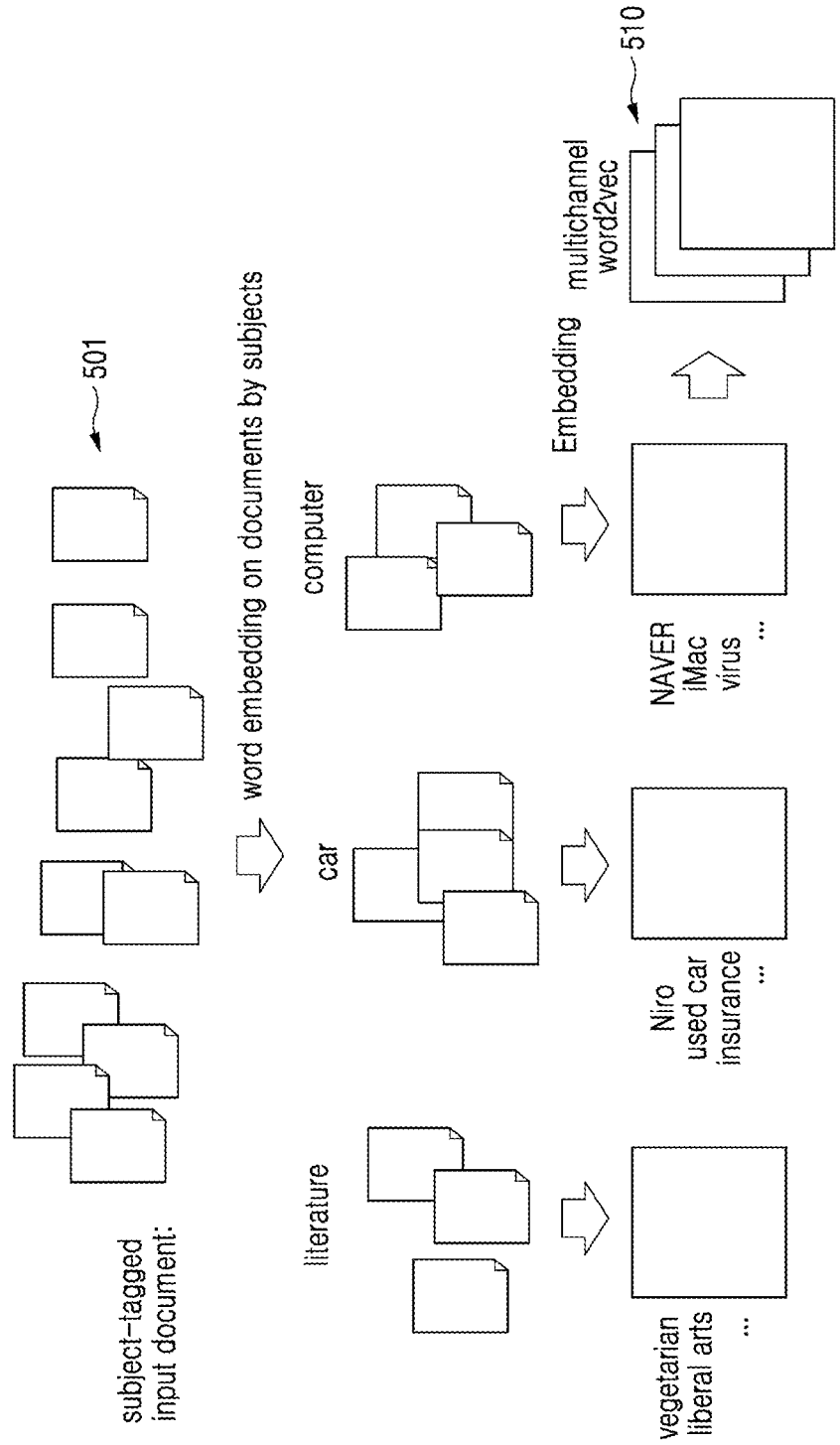
Figure 6:
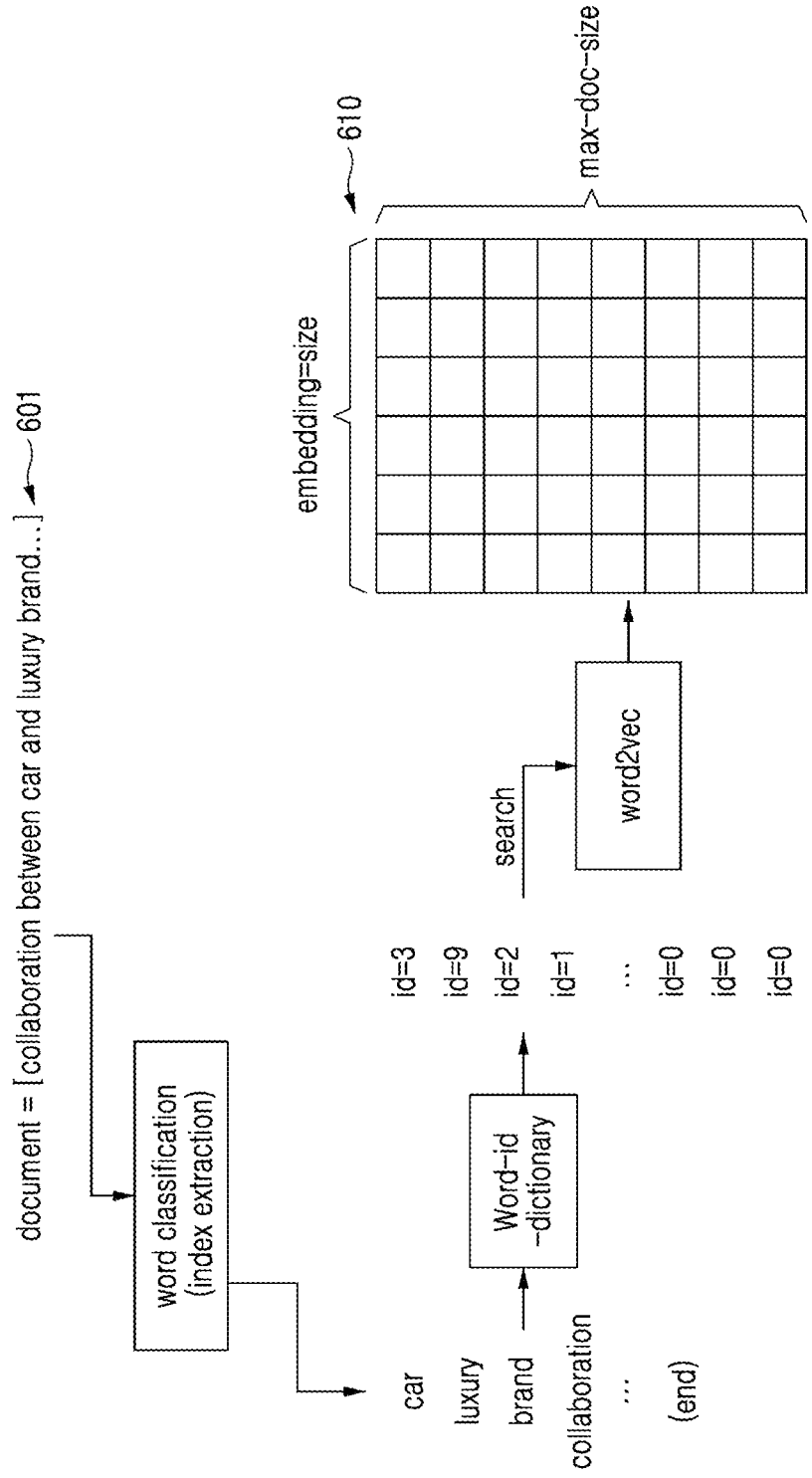
Figure 7:
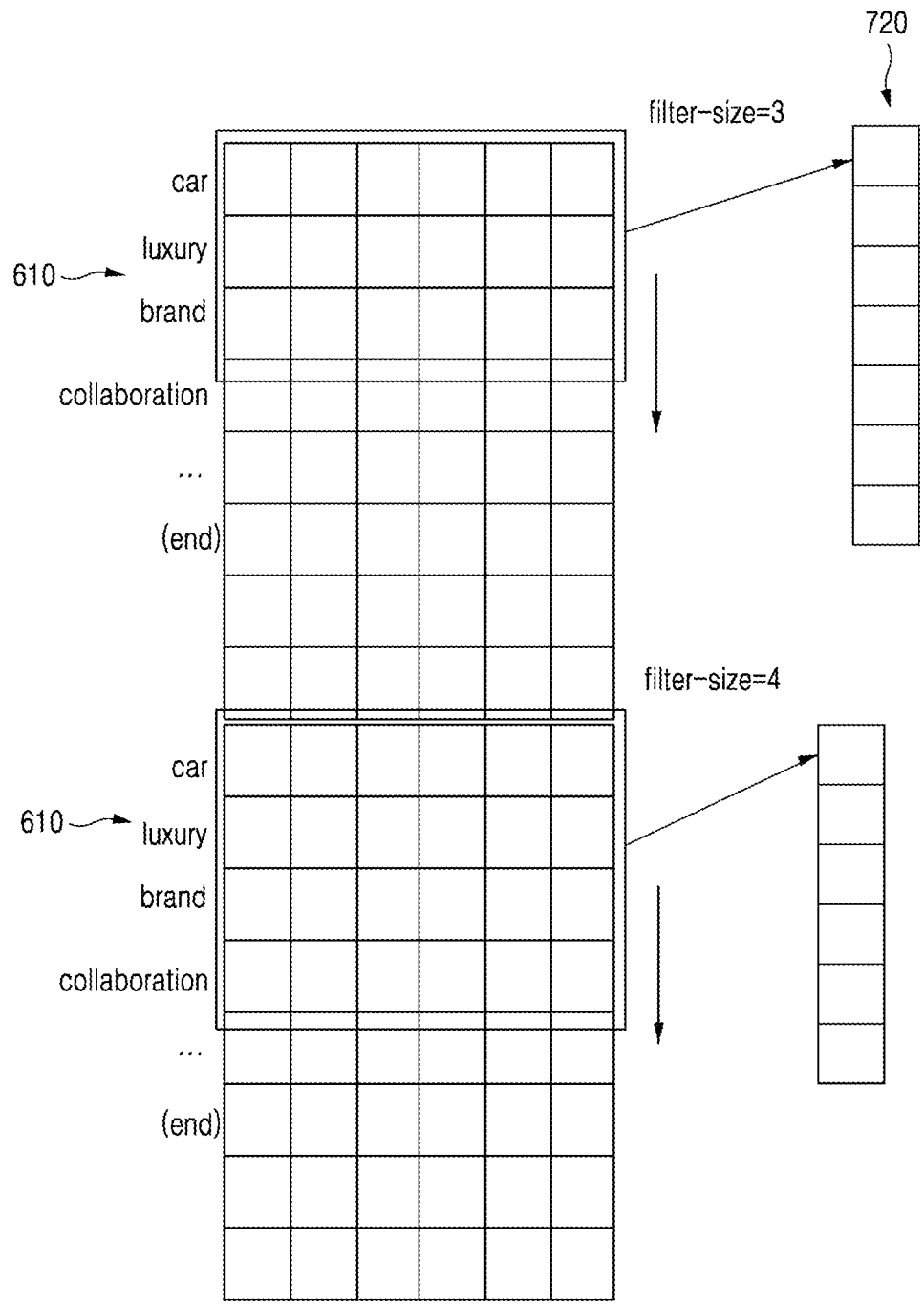
Figure 8:
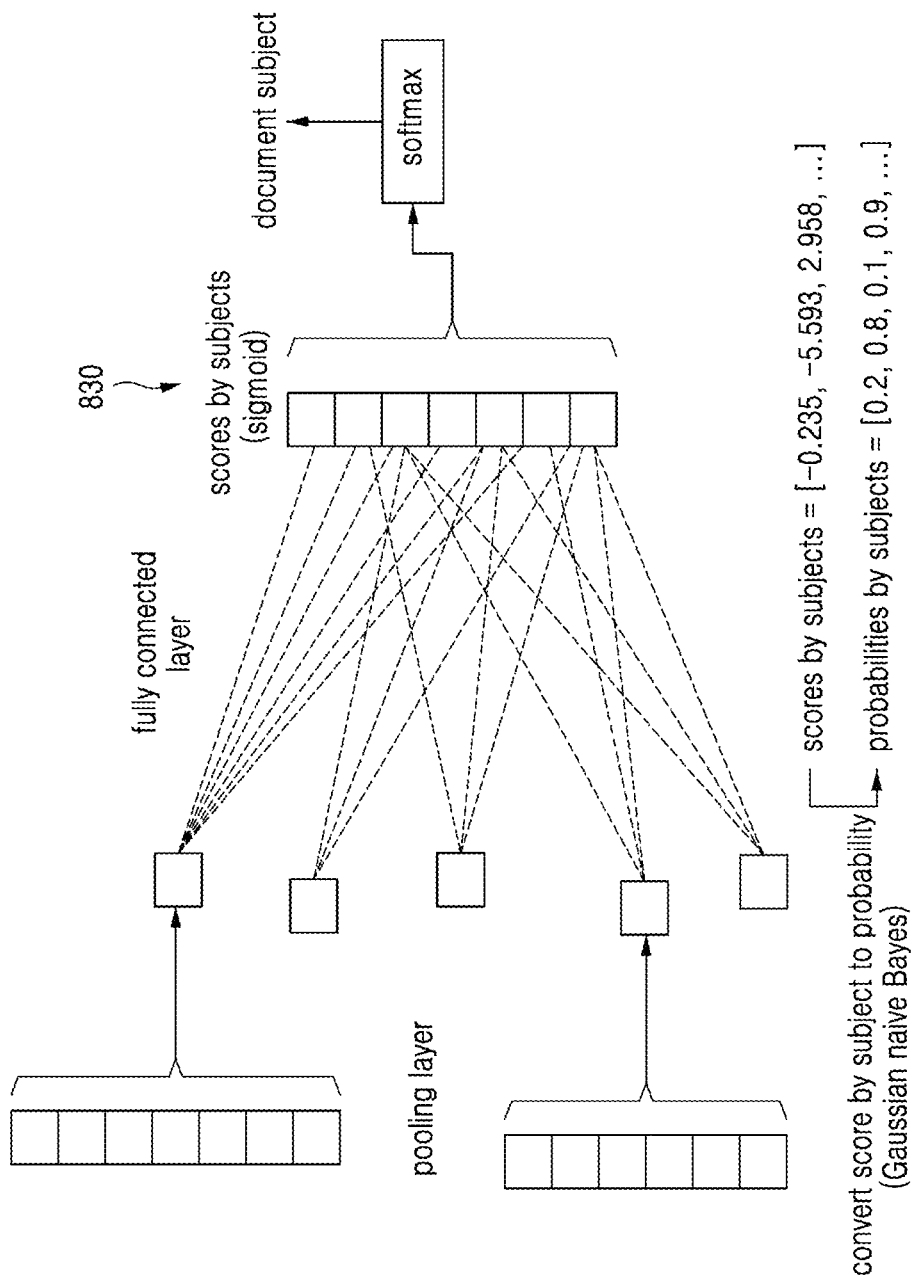

(1) Document Subject:

For example, referring to FIG. 4, the subject classifier 310 may classify a document for each subject using a convolutional neural network (deep learning) learning model 400. In detail, the subject classifier 310 may perform word embedding by assigning an independent vector space for each subject. Referring to FIG. 5, the subject classifier 310 may configure a multichannel input layer 510 for classifying a document subject by performing word embedding for each subject using a subject-tagged input document 501. The subject classifier 310 may represent words included in a document given for subject classification as a multi-dimensional real number vector. For example, referring to FIG. 6, the subject classifier 310 may extract a significant word from a given document 601 using a language preprocessor such as an index extractor, a morphological analyzer, and the like, and may represent the significant word as a word vector 610 corresponding to the multichannel input layer 510. Referring to FIG. 7, the subject classifier 310 may calculate a score by subject 720 for the given document 601 by tracking a word pattern for the subject classification using the word vector 610 of the given document 601. Referring to FIG. 8, the subject classifier 310 may determine a subject of the corresponding given document 601 based on a score by subject 830. Here, the subject classifier 310 may convert the score by subject 830 to a probability, and, for example, may determine a single subject corresponding to a highest probability as a subject of the given document 601. As another example, the subject classifier 310 may use a probability of each subject as a weight with respect to the given document 601. As another example, when selecting a subject of the given document 601, the subject classifier 310 may apply a characteristic (e.g., a subject of a professional field in which a user generally creates a document) of a user having created a corresponding document.

Although the subject classification for the text-based document is described as an example of content, it is provided as an example only. A different type of content, such as an image or a moving picture, in which a subject is tagged in advance or any type of contents of which a subject is classifiable through image analysis may be applied.

(2) Writer Subject

For example, the subject classifier 310 may verify the writer subject from a sum of subjects of documents created by a writer.

To apply a relatively high score to a writer having continuously created a large number of posts on a specific subject for a long period of time, the subject classifier 310 may verify the writer subject by aggregating subjects of documents created by the writer.

The subject classifier 310 may apply a weight to a document-subject score with respect to each of the documents created by the writer and may calculate a writer-subject score through a weighted sum of document-subject scores. Here, the subject classifier 310 may adjust the writer-subject score based on a grade or a type of the writer.

The subject classifier 310 may co-use two types of weights, for example, a first weight for a new post within a short time period (e.g., 1 hour) and a second weight for a new post within a unit period (e.g., 1 day) to apply a normal document creation pattern to a writer-subject score sum. For example, if the writer creates a large number of documents for 1 hour, the subject classifier 310 may decrease a document-subject score based on a creation time interval between the created documents. Alternatively, if the writer creates a large number of documents for 1 day, the subject classifier 310 may decrease a document-subject score based on a number of documents. In this manner, a penalty may be applicable to a subject that is likely to be abused. The first weight is proportional to a time interval difference between times at which documents are created. For example, a significantly low weight may be assigned to a significantly short time by applying a sigmoid function. Here, a sigmoid function value may be differently set for each subject based on a characteristic of each subject. For example, a relaxed function value may be used for a highly timely subject. In the case of the second weight, a weight of a next new post may be applied based on a number of documents created during a unit time. For example, if zero posts are created for 1 day, all the scores may be applied to a first new post. If five new posts are created for 1 day, all the subject scores may be reduced by a half with respect to a next sixth post. That is, according to an increase in the number of posts created for 1 day, a subject score of a next post may be reduced to become closer to zero. For some subjects that are likely to be abused, such as health/medicine, domestic travel, restaurants, business/economy, product reviews, sports, language/foreign languages, parenting/marriage, vehicles, etc., a strict penalty may be applied to a subject score of a next post.

Figure 9:
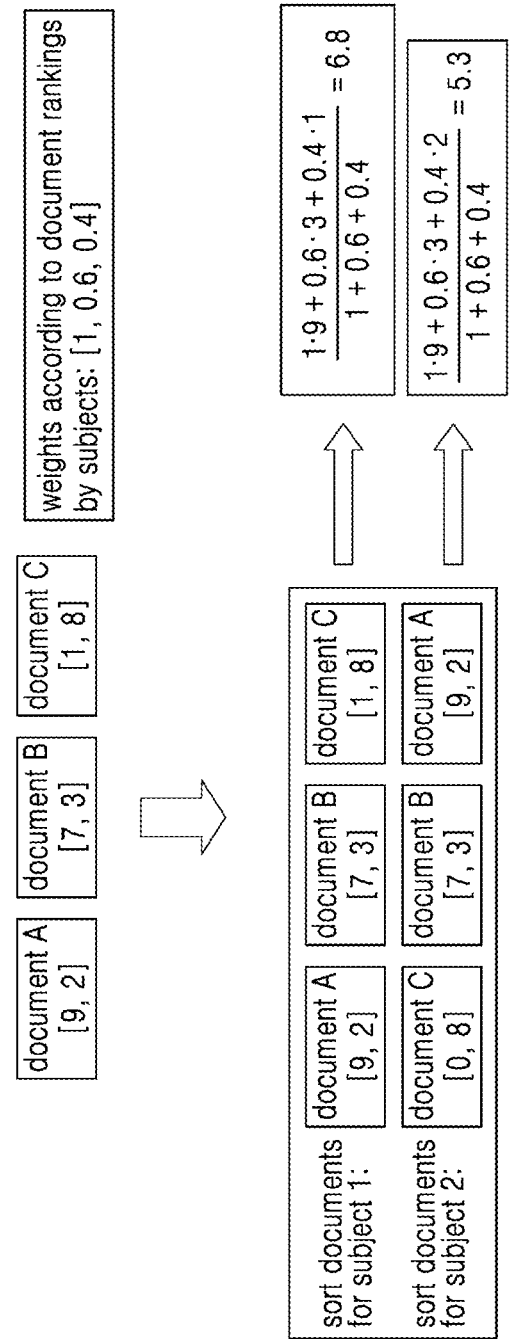
FIG. 9 illustrates an example of a process of verifying a writer subject according to at least one example embodiment.

The subject classifier 310 may calculate a weighted sum of document-subject scores with respect to documents created by the writer. Here, the subject classifier 310 may assign a relatively high weight to a document corresponding to an explicitly specific subject and may assign a weight expressing an exponential attenuation characteristic based on document score rankings by subjects. The subject classifier 310 may sort subject scores of documents created by the writer in descending order and may assign a relatively high weight to a relatively high value among top k subject scores. For example, referring to FIG. 9, when subjects of a document A, a document B, and a document C created by a user are classified into a subject 1 and a subject 2 and a document-subject score for each document is represented as [subject 1, subject 2], the subject classifier 310 may calculate a writer-subject score for each subject by sorting the documents created by the writer in descending order of a subject score for each subject and by applying a weight corresponding to a document ranking for each subject.

The subject classifier 310 may determine, as a writer subject, a single subject corresponding to a highest score among document scores by subjects of the writer that are calculated as writer-subject scores by subjects. As another example, the subject classifier 310 may use a document-subject score of each subject as a weight.

Although a process of verifying the writer subject is described above, it is provided as an example only. A process of verifying a reader subject with respect to documents consumed by the reader may be performed in a manner same as or similar to the aforementioned method.

(3) Query Subject

For example, the subject classifier 310 may verify the query subject from a sum of subjects of documents displayed or clicked on by users that have conducted a document search.

Figure 10:
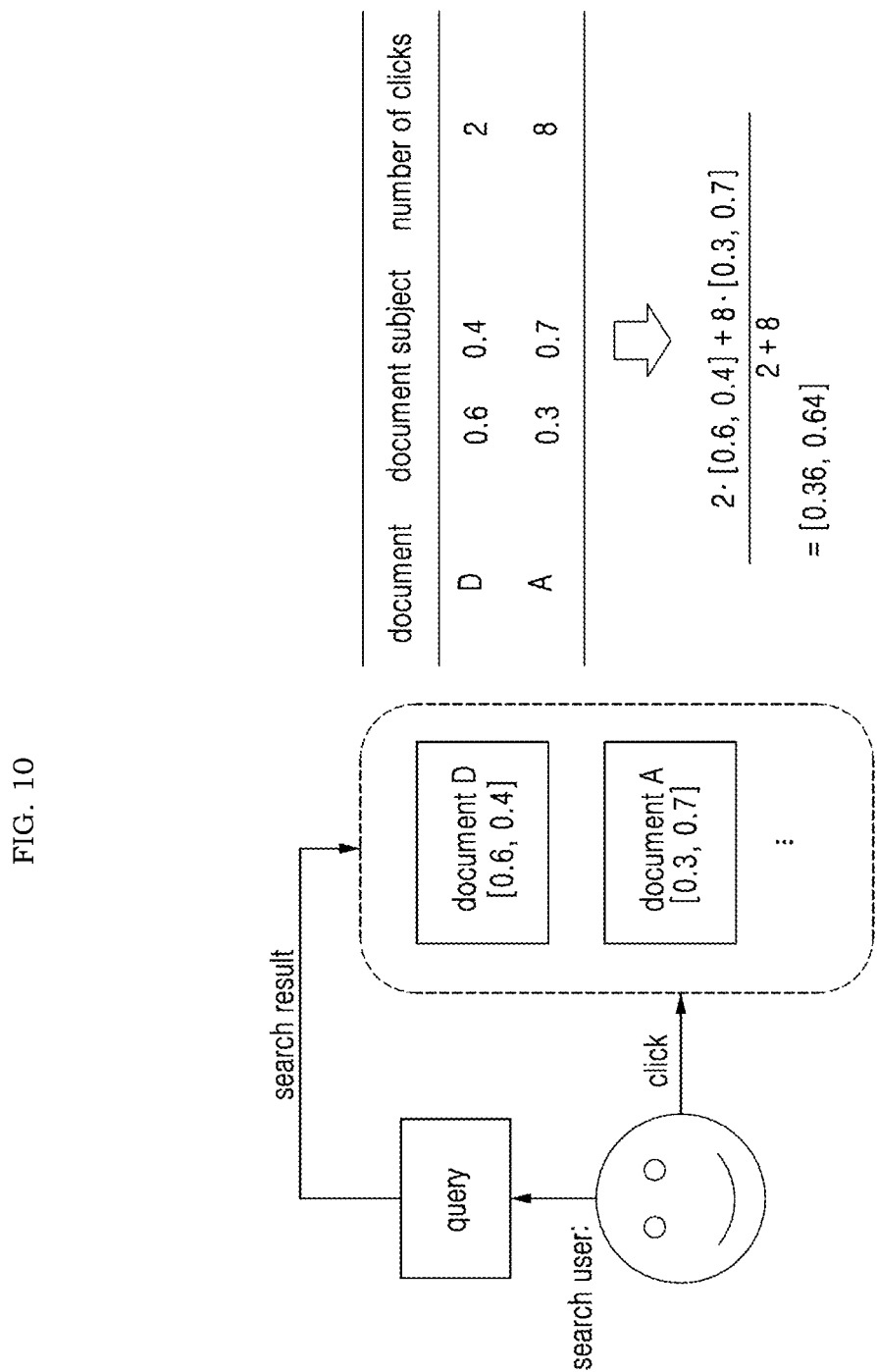
FIG. 10 illustrates an example of a process of verifying a query subject according to at least one example embodiment.

The subject classifier 310 may calculate a query-subject score based on a sum of document-subject scores of the documents clicked on by the users that have conducted a document search. For example, referring to FIG. 10, when subjects are classified into a subject 1 and a subject 2 and a document-subject score for each document is represented as [subject 1, subject 2], the subject classifier 310 may calculate a query-subject score for each subject by applying a number of clicks or a number of displays to each of the documents, for example, a document D and a document A, provided as a search result corresponding a query input from a user.

The subject classifier 310 may determine, as a query subject, a single subject corresponding to a highest score among document-subject scores by subjects for the query that are calculated as query-subject scores by subjects. As another example, the subject classifier 310 may use a document-subject score of each subject as a weight.

Writer Evaluation

The server 150 may display a document of a further "professional" and popular writer having public confidence in an upper ranking by evaluating a writer that creates a document of a corresponding subject and by applying a writer evaluation result to a document ranking, for each subject.

The writer evaluator 320 relates to evaluating how many good posts a corresponding writer has created in which field. The writer evaluator 320 may evaluate a writer for each subject, based on various evaluation factors, such as a number of posts of a corresponding subject that are created by the writer, a number of positive feedbacks (e.g., click, download, like, comments, bookmark, subscription request) that are received from the entire readership, a number of positive feedbacks that are received from "professional" readers (e.g., readers having relatively high evaluation scores) of a corresponding subject, a number of negative feedbacks that are received from all of the readers or "professional" readers of a corresponding subject, and the like.

The writer evaluator 320 may determine writer rankings based on subject scores by writers for a corresponding subject, for each subject. Further, the writer evaluator 320 may evaluate a writer by applying at least one of document quality information, search feedback information, and reader reaction information with respect to documents created by the writer. The document quality information may include a document length, a number of images, an amount of time used for creating a corresponding document, cited reference information, and the like, for each document. The search feedback information may include log information, such as the number of document displays, clicks, visits, and the like. The reader reaction information may include reaction information such as subscription to a corresponding document and a subscription cancellation thereof, and the like.

If a writer has relatively many existing documents as in a blog and also has secured reaction information such as a certain number of subscriptions, the writer may be continuously highly evaluated. To complement this, a popularity and a loyalty on a reader side may be applied to the writer evaluation. For example, to evaluate the writer, the writer evaluator 320 may divide an evaluation period and may apply an evaluation factor, such as a recent period. Further, the writer evaluator 320 may apply a change in an evaluation factor for each period. Accordingly, if the writer has created a large number of documents or if a recently created document gains great popularity, the writer of the corresponding document may be highly evaluated.

Also, in the case of a celebrity, a previous evaluation score may be maintained and reaction information such as subscriptions may steadily occur even without recent creation activity. The writer evaluator 320 may apply a recent activity of a writer in evaluating the writer. For example, if the writer has not created a document during a predetermined, alternatively, desired period of time, the writer evaluator 320 may not apply reaction information after a date on which a recent document is created to the writer evaluation by considering an activity based on a recent document creation date.

Also, due to a short-term event nature, reaction information such as subscriptions may increase suddenly. To exclude evaluation of a corresponding writer, the writer evaluator 320 may limit a portion of evaluation factors used to evaluate writers. For example, the writer evaluator 320 may limit a number of subscriptions or a subscription date that may be applicable to a unit period (e.g., 1 day) for the writer evaluation.

Accordingly, the writer evaluator 320 may calculate a ranking of a writer that creates a document of a corresponding subject for each subject and may evaluate a writer having a relatively high credibility (i.e., "professionality") for the corresponding subject.

Reader Evaluation

The reader evaluation is intended to retrieve a "professional" reader capable of excellently evaluating a document(s) of a writer with respect to a corresponding subject for each subject.

The server 150 may display a document consumed by a further "professional" reader by evaluating readers that consume documents associated with a corresponding subject for each subject and by applying a reader evaluation result to a writer evaluation or document rankings.

The reader evaluator 330 may determine reader rankings based on subject scores by readers for a corresponding subject, for each subject. The reader evaluator 330 relates to determining a field in which readers are interested, and may evaluate a reader for each subject, based on evaluation factors, such as the number of documents that are consumed by the reader on a corresponding subject, the number of positive feedbacks that are input from the reader, the number of significant documents among documents for which the reader inputs positive feedbacks. and the like. Here, the term "significant document" may indicate a document that attracts great interest or popularity from other users, a document that is created by a writer with which the reader has a relationship, such as a writer to which the reader subscribes, and the like.

Accordingly, the reader evaluator 330 may search for a "professional" reader for each subject by aggregating reactions on the Internet on a document registered by a writer for each subject. Here, an evaluation result of readers by subjects may be applied to document rankings or writer evaluation of the same subject.

Figure 11:
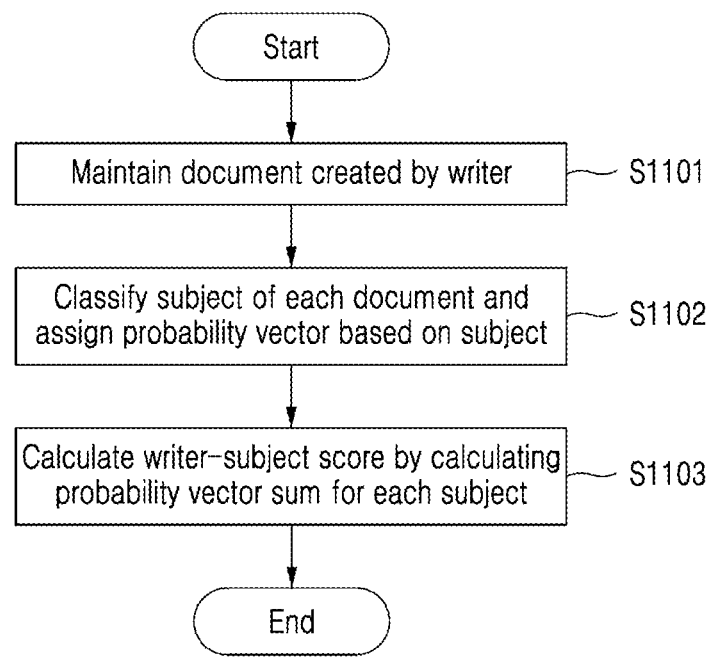
FIG. 11 is a flowchart illustrating an example of a process of calculating a process of calculating a writer-subject score according to at least one example embodiment.

FIG. 11 is a flowchart illustrating an example of a process of calculating a writer-subject score according to at least one example embodiment.

Referring to FIG. 11, in operation S1101, the processor 222 of the server 150 may store and maintain a document created by a writer in a database.

In operation S1102, the subject classifier 310 may classify a subject of each document created by the writer and may assign a probability vector based on the corresponding subject. That is, the subject classifier 310 relates to assigning an independent vector space for each subject, and may assign a probability vector corresponding to a subject to a document created by the writer.

In operation S1103, the subject classifier 310 may calculate a writer-subject score by calculating a probability vector sum, that is, a sum of probability vectors assigned to documents by subjects with respect to the entire set of documents created by the writer. Accordingly, the subject classifier 310 may calculate scores by subject by calculating a sum of probability vectors assigned to documents of a corresponding subject for each subject with respect to the writer that creates the documents.

N subjects may be predefined to classify documents. Here, each subject may be regarded as a dimension of a vector space. A professional field of a writer that creates a corresponding document may be mapped to a vector of an n-dimensional vector space using a probability vector by subject of each document. A result acquired by dividing a vector space for each subject and by aggregating a vector mapped to the vector space divided for each subject may be applied to writer rankings by subjects.

The writer-subject score may be used as a standard for evaluating the credibility of a writer that creates a document of a corresponding subject, that is, a level of "professionality" of the writer in the field of the corresponding subject.

Figure 12:
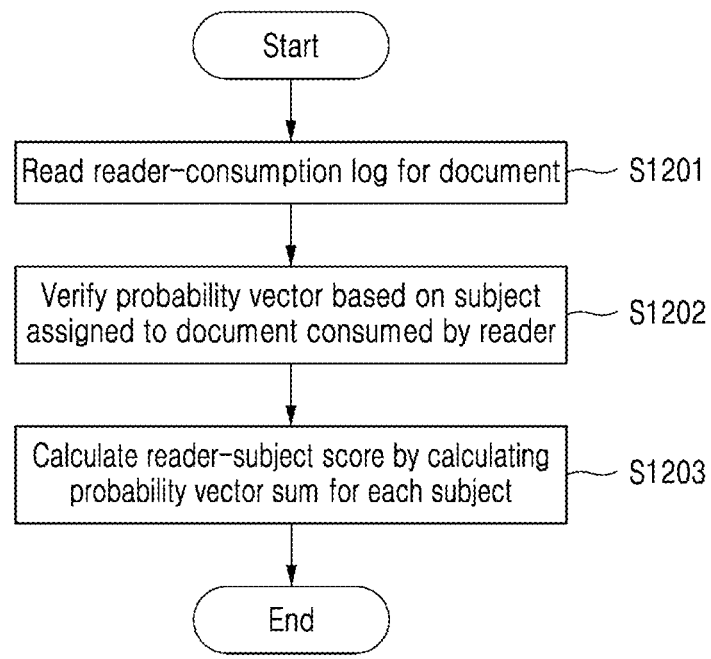
FIG. 12 is a flowchart illustrating an example of a process of calculating a reader-subject score according to at least one example embodiment.

FIG. 12 is a flowchart illustrating an example of a process of calculating a reader-subject score according to at least one example embodiment.

Referring to FIG. 12, in operation S1201, the subject classifier 310 may read a consumption log of a reader on a document from a database. Reaction information, for example, a consumption log such as the number of clicks, downloads, likes, comments, bookmarks, subscription requests, etc., associated with a document in a consumption environment through a search may be recorded. The subject classifier 310 may read the consumption log recorded in association with the reader.

In operation S1202, the subject classifier 310 may verify documents consumed by the corresponding reader based on the consumption log recorded in association with the reader, and may verify a probability vector based on a subject assigned to each of the documents that are consumed by the reader.

In operation S1203, the subject classifier 310 may calculate a reader-subject score by calculating a probability vector sum, that is, a sum of probability vectors assigned to documents by subject with respect to the entire set of documents consumed by the reader. Accordingly, the subject classifier 310 may calculate scores by subject by calculating a sum of probability vectors assigned to documents of a corresponding subject for each subject with respect to the reader that consumes the documents.

Likewise, a field of interest of a reader that consumes a corresponding document may be mapped to a vector of an n-dimensional vector space on a vector space divided for each subject. A result acquired by aggregating a vector mapped to the vector space divided for each subject may be applied to reader rankings by subjects.

The reader-subject score may be used as a standard for evaluating the credibility of a reader that consumes a document of a corresponding subject, that is, a level of "professionality" of the reader in the field of the corresponding subject.

A document registered to the server 150 may have a subject-probability vector of a writer side and a subject-probability vector of a reader side. With respect to each of the users that use a service provided from the server 150, a subject score of the writer side and a subject score of the reader side may be stored and used.

Document Search

When providing a search result in response to an input query, the server 150 may apply, to document rankings of the search result, a writer evaluation regarding the number of documents that are created for a query subject and a reader evaluation regarding the number of documents that are consumed for the query subject as a credibility level according to a writer-reader interaction on the query subject.

Figure 13:
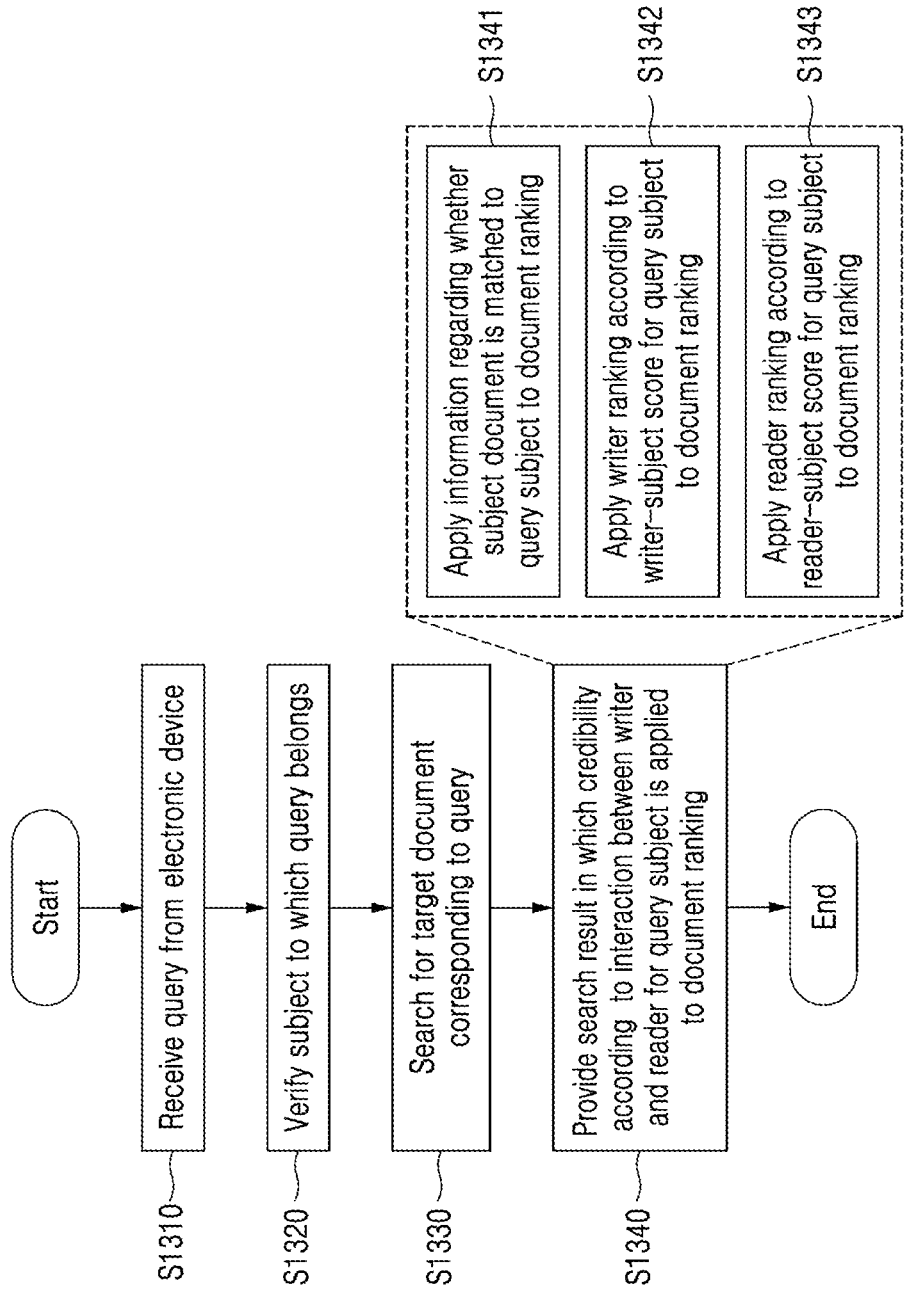
FIG. 13 is a flowchart illustrating an example of a process of providing a search result in which a credibility corresponding an interaction between a writer and a reader is applied to a document ranking according to at least one example embodiment.

FIG. 13 is a flowchart illustrating an example of a process of providing a search result in which a credibility level corresponding to an interaction between a writer and a reader is applied to a document ranking according to at least one example embodiment.

Referring to FIG. 13, in operation S1310, the search conductor 340 may receive a query input from a user of the electronic device 110 from the electronic device 110.

In operation S1320, the search conductor 340 may verify a subject to which the query belongs, that is, a query subject through the subject classifier 310.

In operation S1330, the search conductor 340 may search for a target document corresponding to the query. That is, once the query and the query subject are given, the search conductor 340 may search for the target document suitable for the query through index.

In operation S1340, the search conductor 340 may provide the retrieved target document as a search result and may provide the search result in which a credibility level corresponding to a writer-reader interaction on the query subject is applied to document rankings. The search conductor 340 may retrieve a "professional" writer and a "professional" reader associated with the query subject, and may apply the evaluation result regarding the "professional" writer and the "professional" reader to document rankings associated with the query subject.

In operation S1341, the search conductor 340 may apply, to the document rankings, information regarding whether a document subject is matched to the query subject, with respect to the target document retrieved in operation S1330, and may display a document of which the document subject is matched to the query subject in an upper ranking rather than other documents. The search conductor 340 may display a document corresponding to the query subject and having a relatively high subject score in an upper ranking.

In operation S1342, the search conductor 340 may apply a writer ranking according to a writer-subject score for the query subject to document rankings, with respect to the target document retrieved in operation S1330. That is, the search conductor 340 may display a document of a writer that is "professionalized" in the query subject, that is, a document of a writher that has a relatively high subject score corresponding to the query subject in terms of document creation in an upper ranking.

In operation S1343, the search conductor 340 may apply a reader ranking according to a reader-subject score for the query subject to document rankings, with respect to the target document retrieved in operation S1330. That is, the search conductor 340 may display a document consumed by a reader that is "professionalized" in the query subject, that is, a reader that has a relatively high subject score corresponding to the query subject in terms of document consumption in an upper ranking.

Accordingly, when providing a search result in response to an input query, the search conductor 340 may display a document that is created by a further "professional" writer and/or a document that is consumed by a further "professional" reader with respect to a specific subject to which the query belongs at a relatively top ranking.

According to some example embodiments, it is possible to apply, to document rankings by subjects, an evaluation result of a writer that creates a document of a corresponding subject and an evaluation result of a reader that consumes the document of the corresponding subject.

The units and/or devices described herein may be implemented using hardware components and/or a combination of hardware components and software components. For example, processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented subject-based ranking determining method comprising:
    evaluating a writer that creates content of a corresponding subject for each subject based on the corresponding subject;
    calculating a score by subject for each piece of content using a subject classification learning model;
    calculating a score by subject for the writer by summing a score by subject for each piece of content created by the writer, wherein the calculating of the score by subject for the writer comprises applying a weight corresponding to a number of pieces of contents created by the writer during a unit of time to the score by subject for the writer, wherein when the number of pieces of content created by the writer exceeds a predetermined value, the weight applied to the score by subject for any additional pieces of content is reduced; and
    providing a search result in which an evaluation result of the writer on a subject corresponding to an input query is applied to a content ranking, based on the score, in response to input of the query.

2. The method of claim 1, wherein the evaluating comprises:
    evaluating a reader that consumes a document of a corresponding subject for each subject; and
    applying an evaluation result of the reader to the evaluation result of the writer.

3. The method of claim 1, wherein the providing comprises:
    verifying the subject corresponding to the query;
    searching for target content corresponding to the query; and
    applying a writer ranking corresponding to the score by writer associated with the verified subject to the content ranking of the target content.

4. The method of claim 3, further comprising:
    calculating a score by subject for a reader by summing a score by subject of each of documents consumed by the reader,
    wherein the providing further comprises applying a reader ranking corresponding to a score by reader associated with the verified subject to the content ranking of the target content.

5. A non-transitory computer-readable recording medium storing instructions that, when executed by a processor, cause the processor to perform a subject-based ranking determining method comprising:
    evaluating a writer that creates content of a corresponding subject for each subject based on the corresponding subject;
    calculating a score by subject for each piece of content using a subject classification learning model;

calculating a score by subject for the writer by summing a score by subject for each piece of content created by the writer, wherein the calculating of the score by subject for the writer comprises applying a weight corresponding to a number of pieces of contents created by the writer during a unit time to the score by subject for the writer, wherein when the number of pieces of content created by the writer exceeds a predetermined value, the weight applied to the score by subject for any additional pieces of content is reduced; and providing a search result in which an evaluation result of the writer on a subject corresponding to an input query is applied to a content ranking, based on the score, in response to input of the query.

* * * * *